(12) United States Patent
Kato

(10) Patent No.: US 6,354,843 B1
(45) Date of Patent: Mar. 12, 2002

(54) ELECTRICAL CONNECTOR FOR A VEHICLE BODY SIDE HAVING ENGAGING AND RECESS PORTIONS FOR CONNECTION

(75) Inventor: Katsutoshi Kato, Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/656,122

(22) Filed: Sep. 6, 2000

(30) Foreign Application Priority Data

Sep. 24, 1999 (JP) ............................................. 11-270418

(51) Int. Cl.[7] ............................................... H01R 33/00
(52) U.S. Cl. ...................... 439/34; 439/248; 439/364; 439/595; 439/660
(58) Field of Search ........................ 439/34, 660, 364, 439/595, 752, 248

(56) References Cited

U.S. PATENT DOCUMENTS 5,885,107 A * 3/1999 Sluss et al. .................. 439/595

* cited by examiner

*Primary Examiner*—Tho D. Ta
*Assistant Examiner*—Truc Nguyen
(74) *Attorney, Agent, or Firm*—Oliff & Berridge, PLC

(57) ABSTRACT

A connector is so constructed that terminals 12 on a vehicle body side have contacts 12*a* exposed inwardly from engaging recess 11*a* of a first connector member 10, while terminals 22 on an electrical equipment module side have contacts 22*a* partially exposed outwardly from engaging projections 21*a* of a second connector member, and the connector has a contact structure 30 adapted to bring the terminals 12 on the vehicle body side and the terminals 22 on the electrical equipment module side into contact to electrically connect them to each other by inserting the engaging projections 21*a* of the second connector member 20 into the engaging recess 11*a* of the first connector member 10.

10 Claims, 10 Drawing Sheets

ELECTRICAL CONNECTOR FOR A VEHICLE BODY SIDE HAVING ENGAGING AND RECESS PORTIONS FOR CONNECTION

BACKGROUND OF THE INVENTION

1. Field of the Invention

The present invention relates to a connector for fitting various kinds of electrical equipment modules to a panel on a vehicle body side to electrically connect them with each other.

2. Description of the Prior Art

In conventional assembling steps of overhead modules, meter modules, door modules, etc. in a vehicle, there has been employed such a wiring and connecting method that a connector of a wire harness of the panel on the vehicle body side (for example, a roof panel, a dashboard, a door panel) are connected by hand with a connector of a wire harness of various kinds of the electrical equipment modules, and then, the electrical equipment modules are attached to the panel on the vehicle body side.

Specifically, in case of a sun visor, for example, as shown in FIGS. 13 and 14, a horizontal shaft portion 93b of a pipe stay 93 in an L-shape whose vertical shaft portion 93a is rotatably supported by means of a stay holder 92 which is fitted to a roof panel 91 within the vehicle is inserted into a visor holder 95 of a sun visor body 94. Thus, the sun visor body 94 is supported swingably in a vertical direction around a horizontal axis.

The sun visor body 94 has a vanity mirror 96 and a vanity lamp 97 provided on a frame 98. When a lid (not shown) of the vanity mirror 96 is opened, the vanity lamp 97 will be switched on to be lit.

One ends of a pair of electric wires 90 are connected to this vanity lamp 97. The electric wires 90 are passed through the above described stay 93 and adapted to electrically connect the vanity lamp 97 on the sun visor body side with a battery on the vehicle body side, by coupling a connector 99 on the sun visor body side at the other ends of the electric wires with a connector 82 on the vehicle body side which is connected to an electric wire 81 from the battery within the roof panel 91.

On occasion of a vertical swinging motion of the sun visor body 94 around the horizontal axis of the stay 93 and a lateral swinging motion (when used as a side visor) of the sun visor body 94 around the vertical axis of the stay 93, the each electric wire is twisted to permit the each swinging motion.

When the stay holder 92 supporting the stay 93 of the sun visor body 94 is assembled to the roof panel 91, the connector 82 on the vehicle body side is first drawn from a fitting hole 91a of the roof panel 91 to an interior of the vehicle, and then, a worker grasps the connector 82 on the vehicle body side with his one hand while holding the sun visor body 94 under the arm, and he also grasps the connector 99 on the sun visor body side with his other hand thus to couple the connectors. Thereafter, while he pushes the connector 82 on the vehicle body side together with the electric wire 81 into the roof panel 91 through the fitting hole 91a, he pushes also the connector 99 on the sun visor body side together with the electric wires 90 into the fitting hole 91a. Afterward, the stay holder 92 is attached to the roof panel 91 and fixed by screws.

However, because the connectors need to be coupled by hand in order to connect the wirings with each other in the conventional connector assembly, fitting workability has been bad. In addition, since an extra length is required in the wire harnesses of the respective connectors, there have been such fears that an unusual noise may be caused by driving vibration, or bites of the electric wires may occur during the fitting work.

More specifically, in case of the sun visor, for example, because the worker must couple the connectors 99 and 82 by both hands, while holding the sun visor body 94 under the arm facing toward the roof, the coupling work of the connectors has been annoying. Thereafter, he must push the electric wires 81, 90 and the connectors 99, 82 into the roof panel 91 through the fitting hole 91a respectively, and therefore, there have been various problems that the fitting work of the sun visor is annoying, or so.

SUMMARY OF THE INVENTION

The present invention has been made to solve the problems in the prior art as described above, and it is an object of the present invention to provide a connector in which various kinds of electrical equipment modules can be electrically connected to a panel on a vehicle body side without providing an extra length in a wire harness, fitting work can be simplified, an occurrence of an unusual noise will be prevented, and bites of electric wires during the fitting work can be avoided.

The connector according to the present invention is a connector for electrically connecting various electrical equipment modules to a panel on a vehicle body side, the connector comprises:

a first connector member attached to the panel on the vehicle body side and provided with a housing having an engaging recess, the first connector member containing a first terminal on the vehicle body side, the first terminal having a contact exposed inwardly from the engaging recess of the first connector member; and a second connector member provided with a housing having an engaging projection adapted to be engaged with the engaging recess of the first connector member, the second connector member containing a second terminal on an electrical equipment module side, the second terminal having a contact partially exposed outwardly from the engaging projection of the second connector member;

wherein, when the engaging projection of the second connector member is inserted into the engaging recess of the first connector member, the contact of the first terminal is electrically contactable to the contact of the second terminal.

Another connector according to the present invention is a connector for electrically connecting various electrical equipment modules to a panel on a vehicle body side, the connector comprises:

a first connector member attached to the panel on the vehicle body side and provided with a housing having an engaging projection, the first connector member containing a first terminal on the vehicle body side, the first terminal having a contact partially exposed outwardly from the engaging projection of the first connector member; and a second connector member provided with a housing having an engaging recess adapted to be engaged with the engaging projection of the first connector member, the second connector member containing a second terminal on an electrical equipment module side, the second terminal having a contact exposed inwardly from the engaging recess of the second connector member;

wherein, when the engaging projection of the first connector member is inserted into the engaging recess of the second connector member, the contact of the first terminal is electrically contactable to the contact of the second terminal.

According to the above described structure, when the engaging recess (or the engaging projection) of the first connector member attached to the panel on the vehicle body side is engaged with the engaging projection (or the engaging recess) of the second connector member, the contact of the first terminal on the vehicle body side is electrically contactable to the contact of the second terminals on the electrical equipment module side to be electrically connected. Accordingly, the various kinds of the electrical equipment modules can be fitted to the panel on the vehicle body side without providing an extra length on a wire harness. Therefore, a fitting work can be simplified, an occurrence of an unusual noise by driving vibration and bites of the electric wires during the fitting work will be prevented.

In the above described connector according to the present invention, in case where the contact of at least one of the first terminal on the vehicle body side and the second terminal on the electrical equipment module side is formed in a tongue shape, it will be possible to enhance reliability of the electrical connection between the contacts.

In case where the contact of one of the above described terminal on the vehicle body side and the terminal on the electrical equipment module side is formed in a tongue shape, and the contact of the other of the terminals is formed in an exposed conductive foil of an FPC or FFC, it will be possible to conduct a multi-contact wiring and to enlarge a scope of application of the present invention.

Preferably, the above-described connector includes a locking part for locking the terminals to the housings of the connector members, respectively. With this feature, the workability of the fitting work can be further improved.

The above described connector is advantageous in case where the panel on the vehicle body side is a roof panel, and the electrical equipment module is a sun visor unit provided with an electric circuit.

DETAILED DESCRIPTION OF THE PREFERRED EMBODIMENTS

Figure 1:
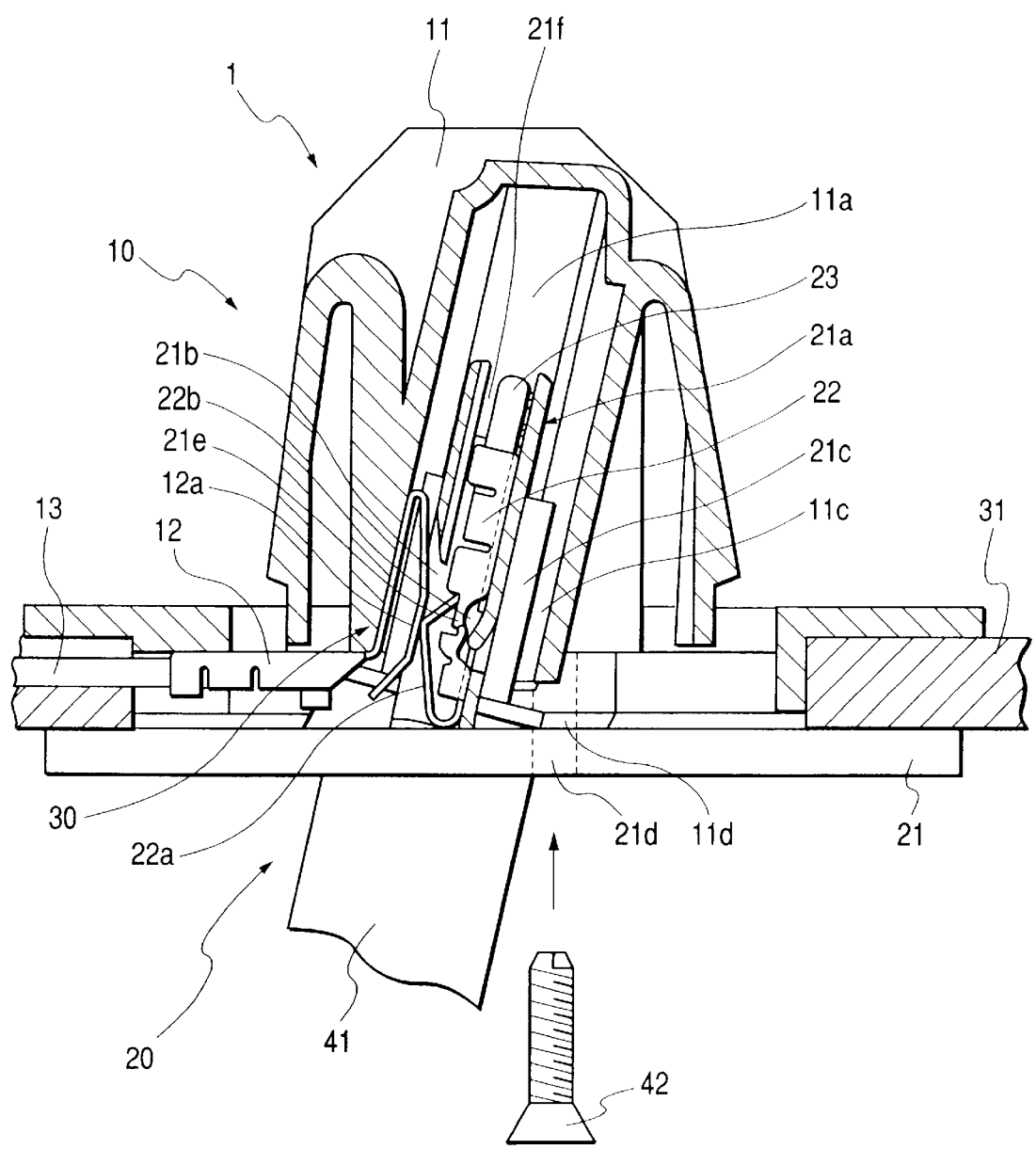
FIG. 1 is a cross sectional view showing a structure of a connector according to a first embodiment of the present invention.

Now, embodiments according to the present invention will be described in detail referring to the drawings.

FIRST EMBODIMENT

FIGS. 1 to 9 show a structure of a connector according to a first embodiment of the present invention.

A connector 1 is designed to electrically connect various kinds of electrical equipment modules such as a sun visor unit provided with an electric circuit, an overhead module, a meter module, and a door module, etc. in an automobile to a panel 31 on a vehicle body side such as a roof panel, a dashboard, and a door panel.

Figure 2:
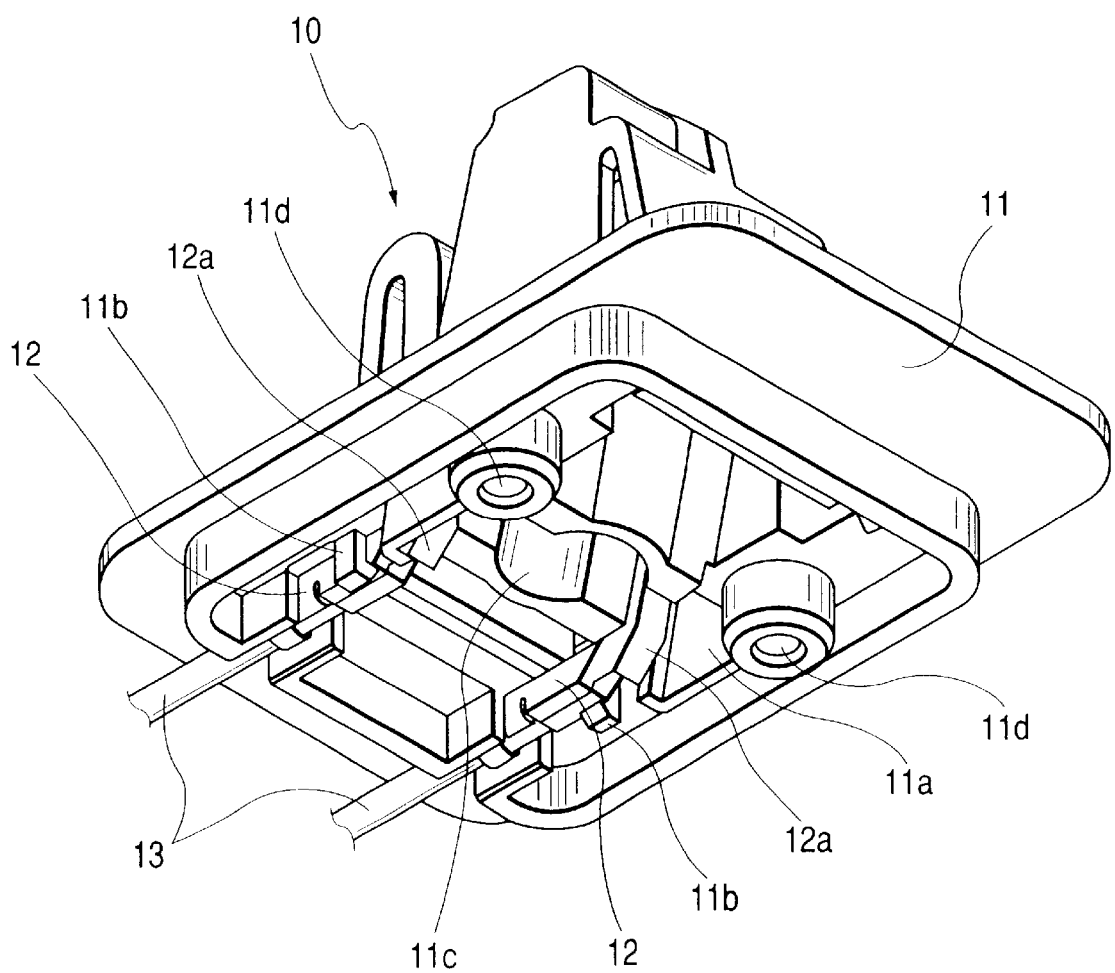
FIG. 2 is a perspective view of a first connector member in the connector according to the first embodiment of the present invention as seen from the below.
Figure 4:
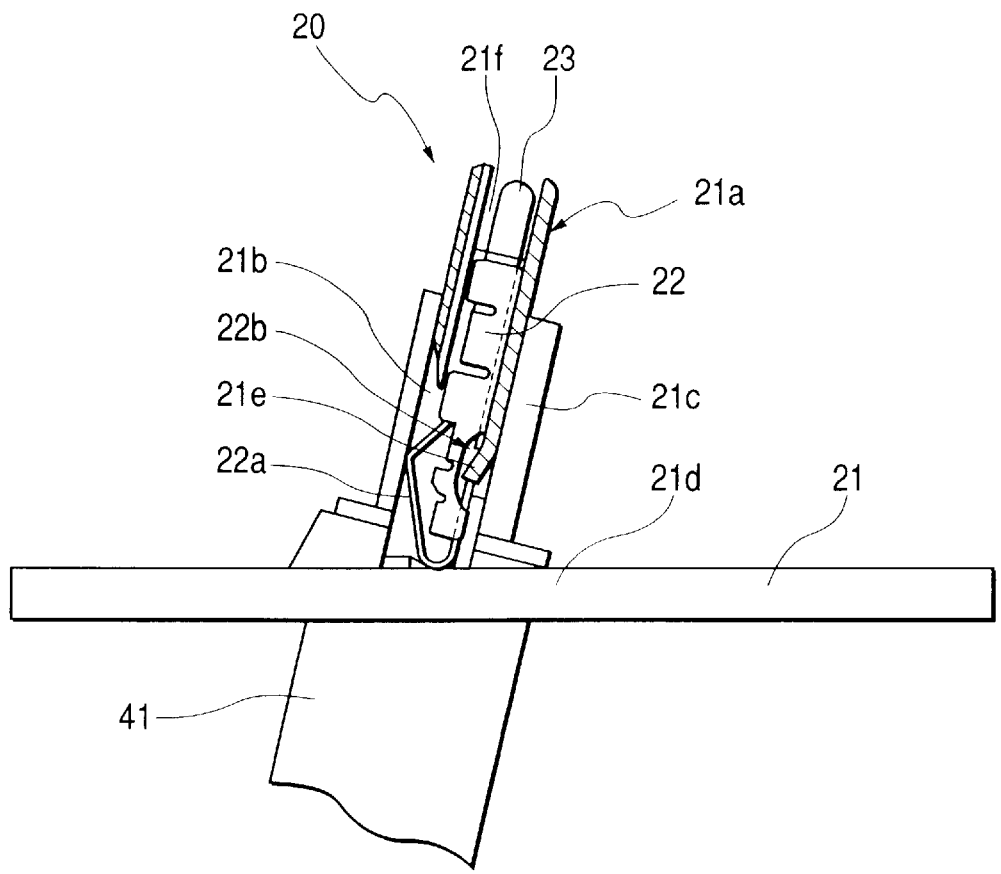
FIG. 4 is a cross sectional view showing a second connector member in the connector according to the first embodiment of the present invention.
Figure 6:
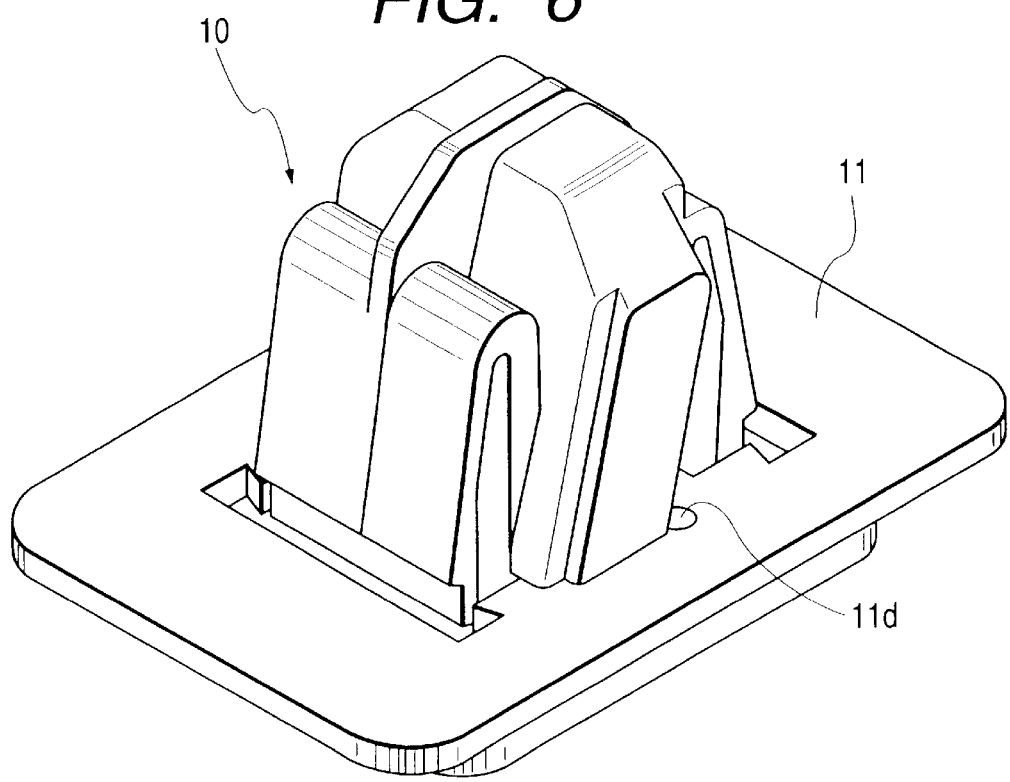
FIG. 6 is a perspective view of the first connector member in the connector according to the first embodiment of the present invention as seen from the above.
Figure 7:
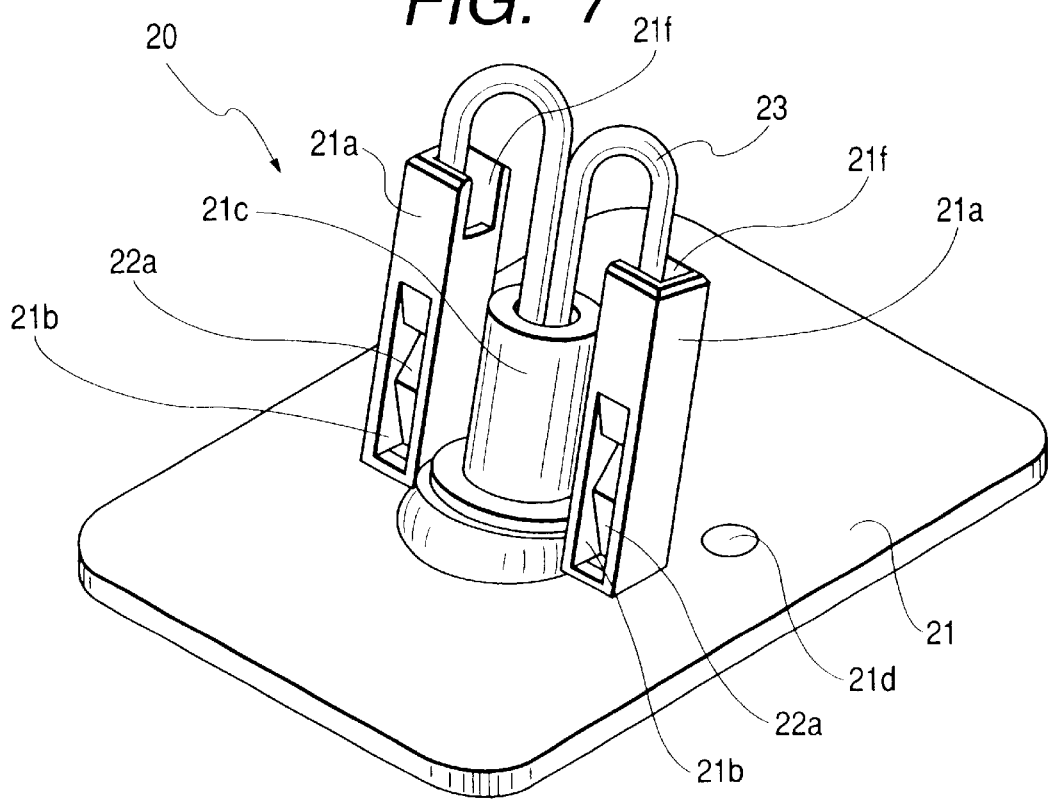
FIG. 7 is a perspective view of the second connector member in the connector according to the first embodiment of the present invention as seen from the above.

The connector 1 comprises a first connector member 10 attached to the panel 31 on the vehicle body side and provided with a housing 11 having a engaging recess 11a and containing terminals 12 on the vehicle body side as shown in FIGS. 2 and 6, and a second connector member 20 provided with a housing 21 having engaging projections 21a adapted to be engaged with the engaging recess 11a and containing terminals 22 on an electric equipment module side as shown in FIGS. 4 and 7. Each of the terminals 12 on the vehicle body side has contact 12a exposed inwardly from the engaging recess 11a, and each of the terminals 22 on the electrical equipment module side has a contact 22a partially exposed outwardly from the engaging projections 21a. The connector 1 further comprises a contact structure 30 adapted to bring the terminals 12 on the vehicle body side and the terminals 22 on the electrical equipment module side into contact to electrically connect them to each other, by inserting the engaging projections 21a of the second connector member 20 into the engaging recess 11a of the first connector member 10.

Figure 3:
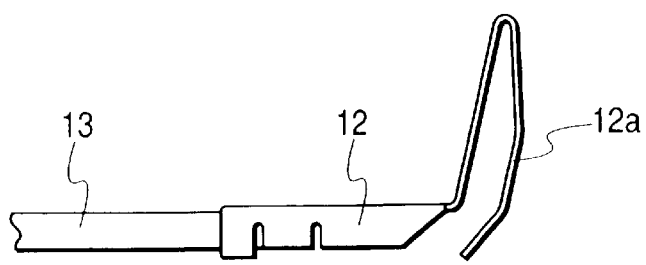
FIG. 3 is a view showing a terminal on a vehicle body side in the connector according to the first embodiment of the present invention.

Each of the above described terminals 12 on the vehicle body side has the contact 12a in a tongue shape which is crooked in a direction different from an extending direction of an electric cable 13 on the vehicle body side as shown in FIG. 3, and connected to the electric cable 13 on the vehicle body side by press-fitting or the like. As shown in FIG. 2, the terminal 12 on the vehicle body side is so constructed that the terminal 12 on the vehicle body side is locked to the first connector member 10 by means of a locking part having a locking claw 11b or the like provided in the housing 11 of the first connector member 10, and the contact 12a in the tongue shape is contained in a cavity.

Figure 5:
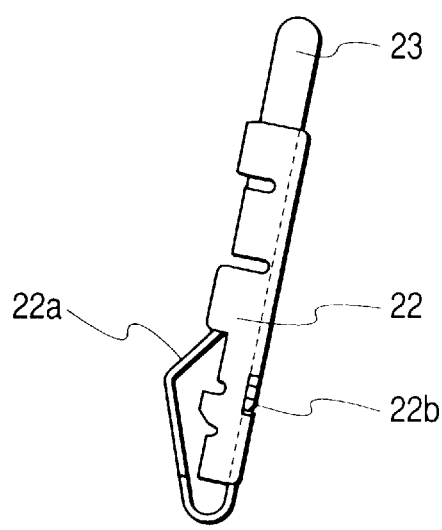
FIG. 5 is a view showing a terminal on an electrical equipment module side in the connector according to the first embodiment of the present invention.

As shown in FIG. 5, each of the terminals 22 on the electrical equipment module side has the contact 22a in a tongue shape and connected to an electric cable on the electrical equipment module side by press-fitting or the like. This terminal 22 is so constructed as shown in FIGS. 1 and 4, that the terminal 22 on the electrical equipment module side is locked to the second connector member 20 by means of a locking part having a locking hole 22b, a locking claw 21e provided in the engaging projection 21a of the housing 21 of the second connector member 20 so as to project into a cavity 21f, and so on.

In case where the electrical equipment module is a sun visor unit provided with an electric circuit which has been described as the prior art, and the panel 31 on the vehicle body side is a roof panel, as shown in FIG. 2, the terminals 12 on the vehicle body side are fixed to the housing 11 of the first connector member 10 by means of the locking claws 11b, and then, the housing 11 is fixed to the roof panel 31.

Next, after the electric cables 23 connected to the sun visor body (not shown) are passed through a cylindrical part 21c with a slight extra length, the terminals 22 on the electrical equipment module side are inserted into the cavities 21f in the engaging projections 21a of the housing 21 of the second connector member 20. Then, the terminals 22 on the electrical equipment module side are locked to the housing 21 of the second connector member 20 by the engagement between the locking holes 22b of the terminals 22 on the electrical equipment module side and the locking claws 21e. Each of the engaging projections 21a in a shape of a pillar is partially provided with an opening 21b at one side face of the engaging projection 21a as shown in FIG. 7, and the tongue-shaped contacts 22a of the terminals 22 on the electrical equipment module side are exposed to the exterior through the openings 21b, respectively.

Figure 8:
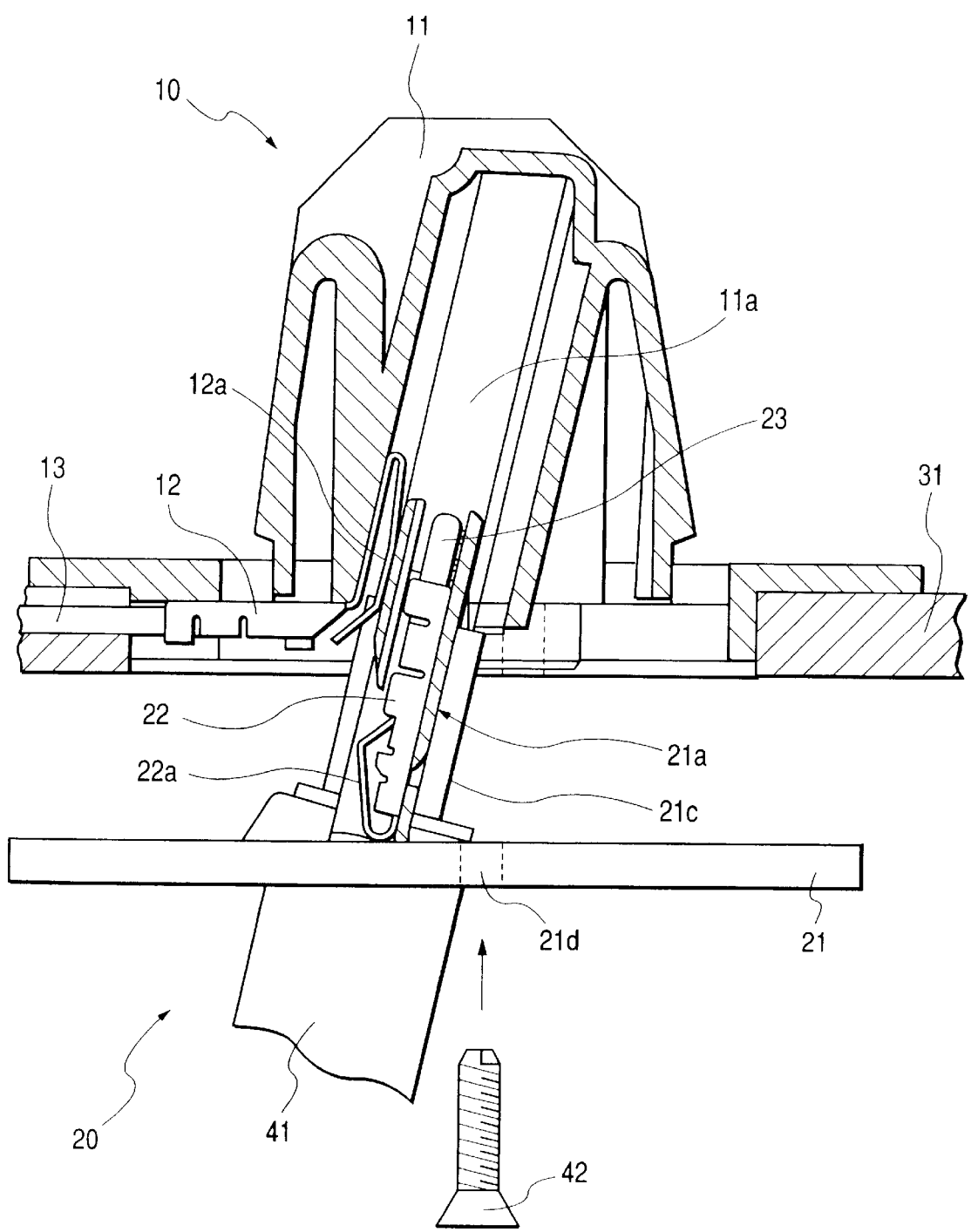
FIG. 8 is a cross sectional view showing a state wherein engaging projection of the second connector member start to be inserted into engaging recess of the first connector member in the connector according to the first embodiment of the present invention.
Figure 9:
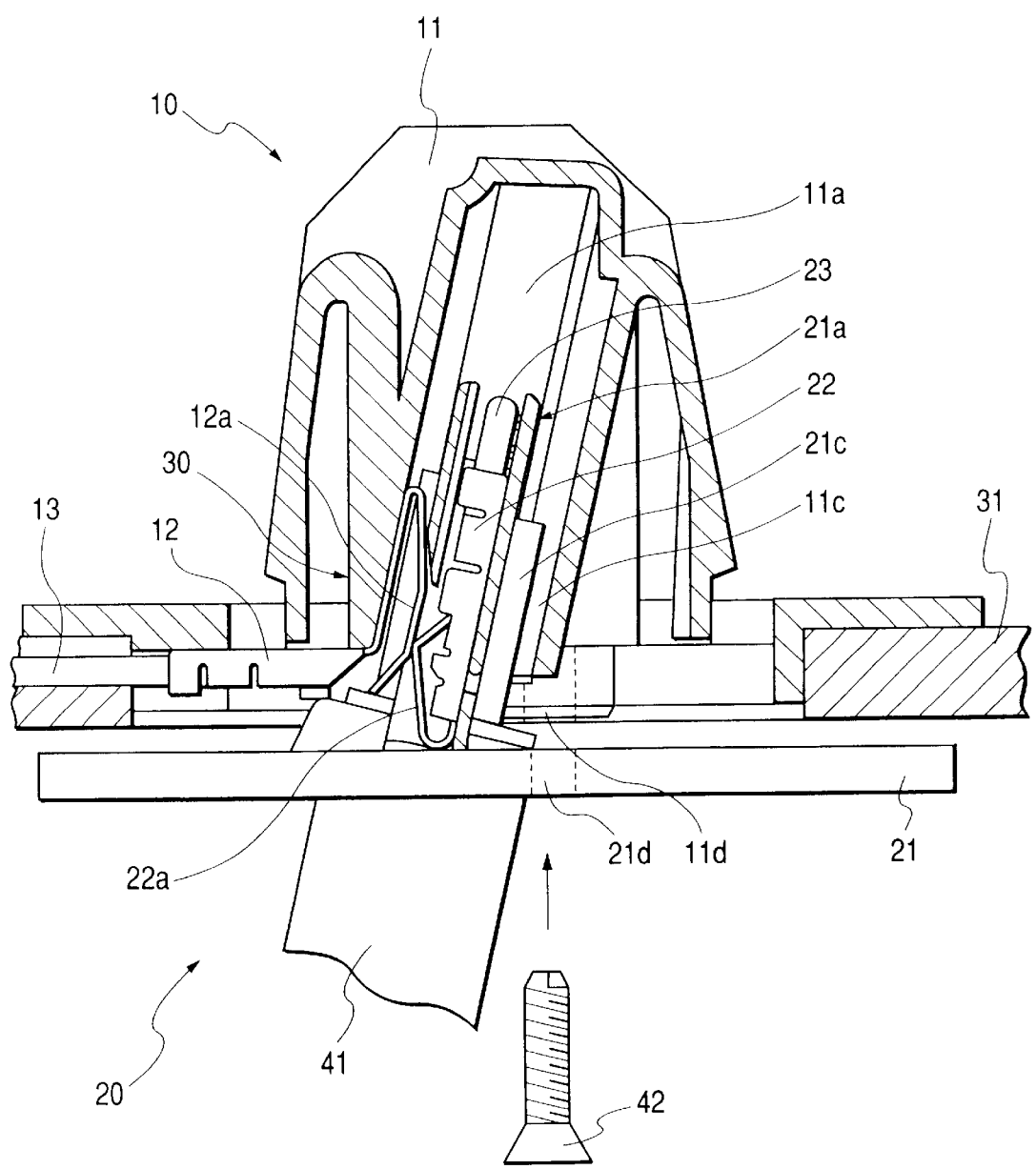
FIG. 9 is a cross sectional view showing a state wherein engaging projection of the second connector member is inserted into engaging recess of the first connector member in the connector according to the first embodiment of the invention, whereby the terminal on a vehicle body side is electrically connected to the terminal on the electrical equipment module side.

As shown in FIG. 8, by inserting the engaging projections 21a of the second connector member 20 into the engaging recess 11a of the first connector member 10 which is fixed to the roof panel 31, the tongue-shaped contacts 12a of the terminals 12 on the vehicle body side are pressed down against resilient forces at outer faces of the engaging projections 21a of the second connector member 20.

By further inserting the engaging projections 21a of the second connector member 20 into the engaging recess 11a of the first connector member 10 which is fixed to the roof panel 31, the tongue-shaped contacts 12a of the terminals 12 on the vehicle body side arrive at the openings 21b of the engaging projections 21a, and enter into the openings 21b by the resilient forces, and thereby come into contact with the tongue-shaped contacts 22a of the terminals 22 on the electrical equipment module side so as to electrically connect the contacts of both the terminals 12, 22 with each other. Incidentally, ] a cylindrical part 21c of the housing 21 enters in a relief recess 11c formed in the housing 11 so as not to interfere.

Next, as shown in FIG. 1, a flange portion of the housing 21 of the second connector member 20 is abutted against a lower face of the roof panel 31, and screws 42 are screwed into female threads 11d of the housing 11 through fitting holes 21d of the housing 21. Thus, the fitting work will be completed.

Figure 14:
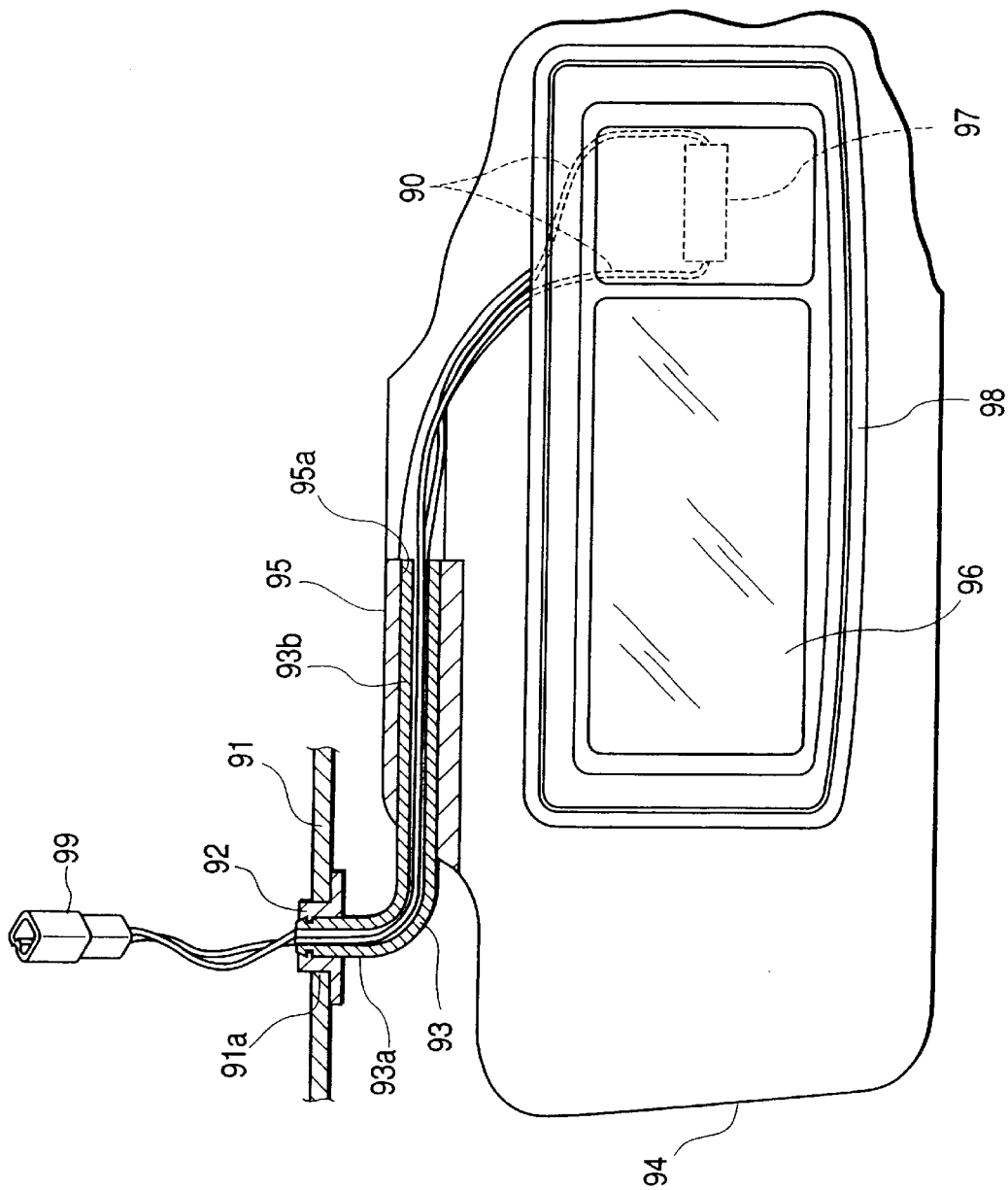
FIG. 14 is a view showing the wiring method by means of the conventional connector of the sun visor unit provided with the electric circuit.

Although a sun visor body is omitted in the drawings herein, a stay 41 as shown in FIG. 1 corresponds to a stay 93 as shown in FIG. 14, and the sun visor body 94 similar to the prior art can be fitted thereto.

SECOND EMBODIMENT

Figure 10:
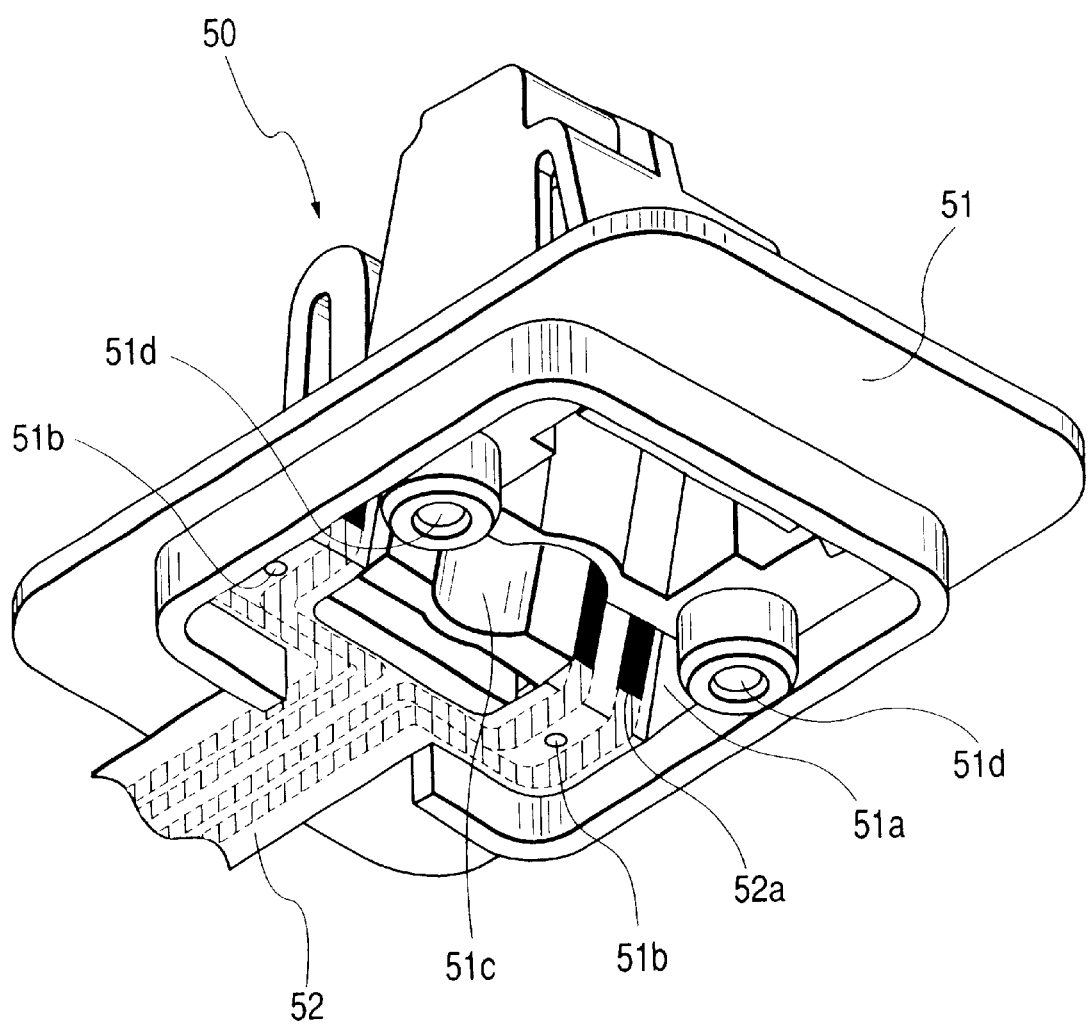
FIG. 10 is a perspective view of the first connector member in the connector according to the second embodiment of the present invention as seen from the below.
Figure 11:
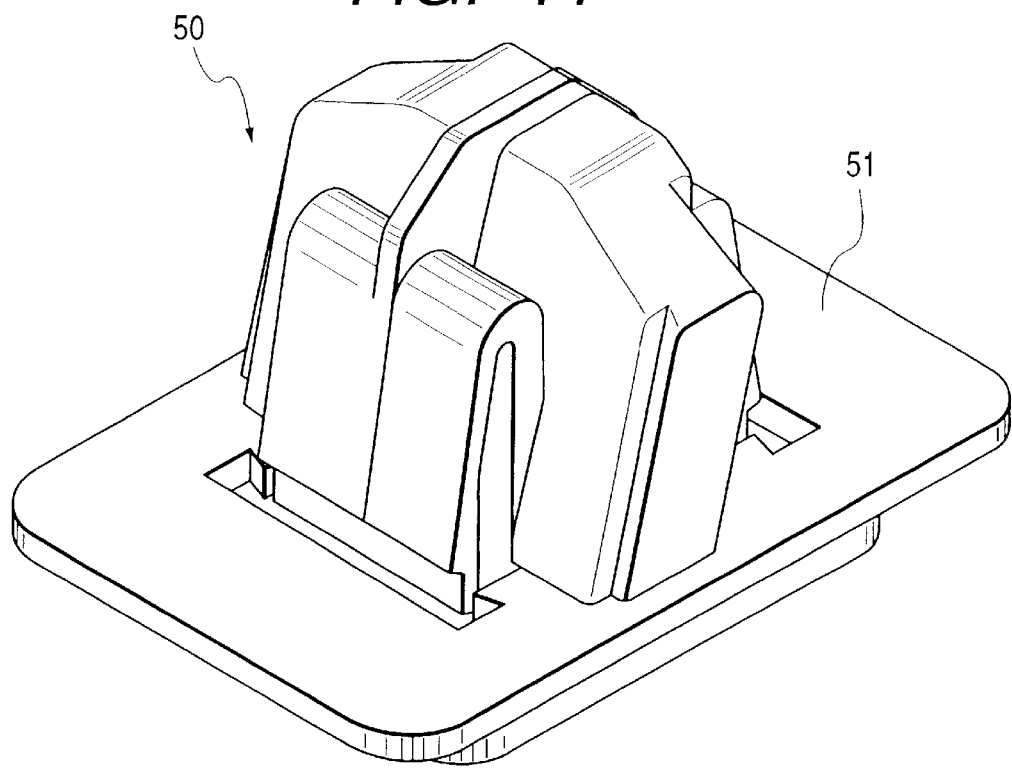
FIG. 11 is a perspective view of the first connector member in the connector according to a second embodiment of the present invention as seen from the above.
Figure 12:
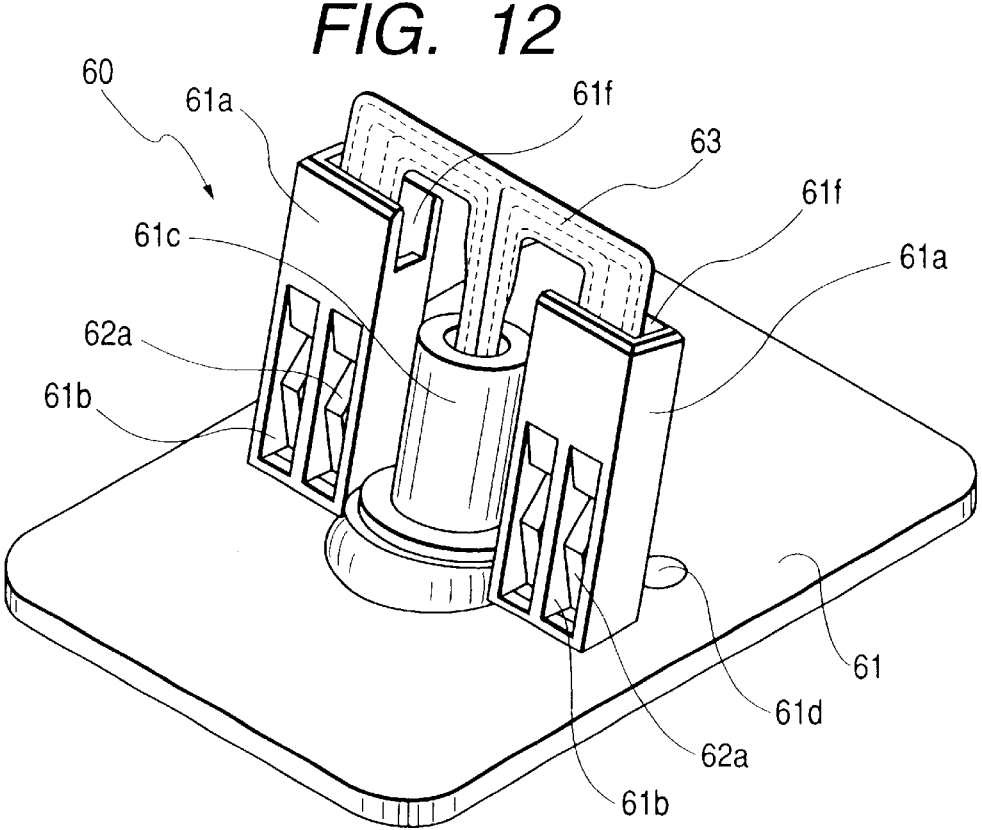
FIG. 12 is a perspective view of the second connector member in the connector according to the second embodiment of the present invention as seen from the above.
Figure 13:
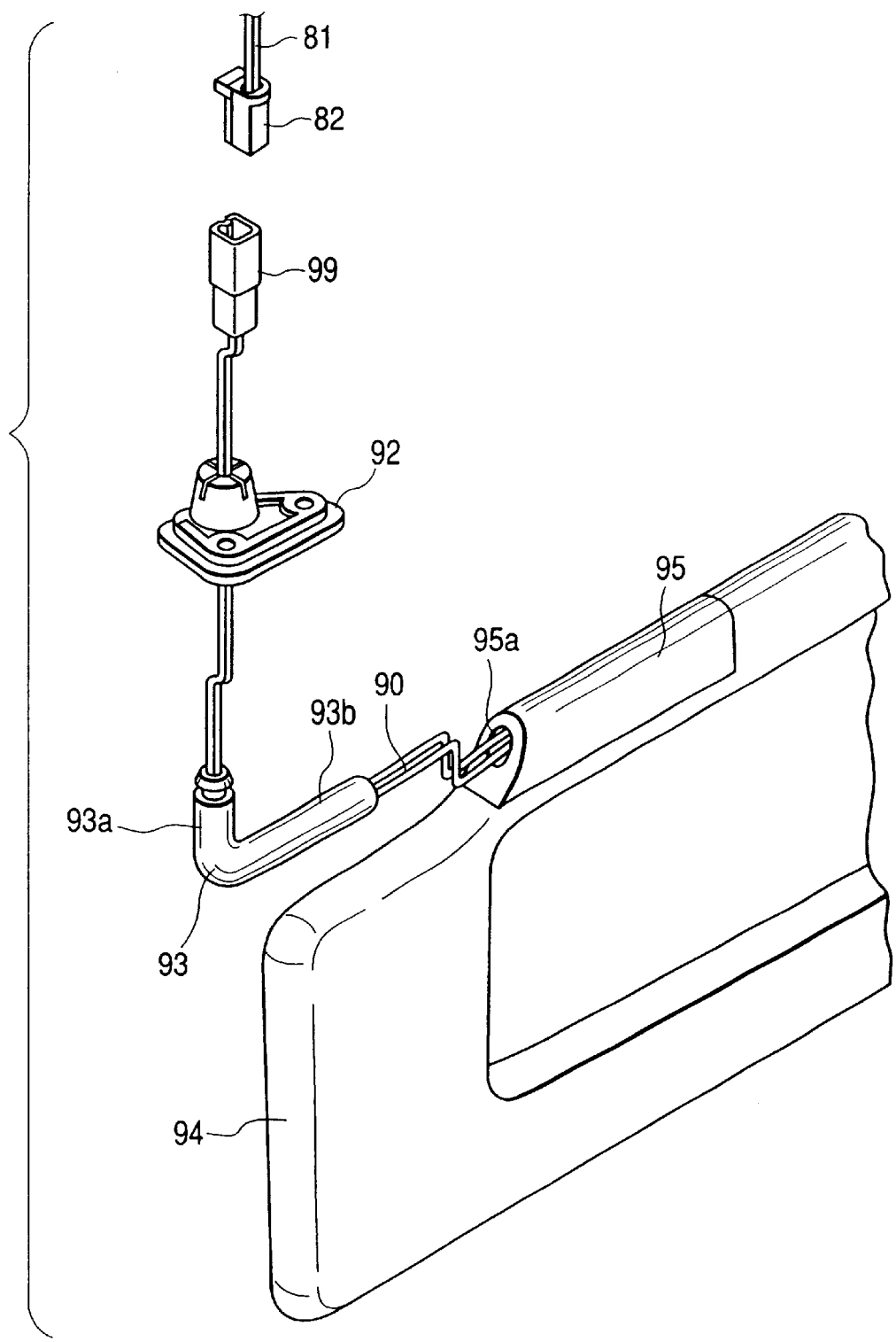
FIG. 13 is a perspective view showing a wiring method by means of a conventional connector of a sun visor unit provided with an electric circuit.

FIGS. 10 to 12 show a structure of a connector according to a second embodiment of the present invention.

The connector is different from the above described first embodiment in that a multi-contact wiring is conducted employing a FPC (flexible printed circuit) or a FFC (flexible flat cable) instead of the ordinary electric cable 23. The other components are the same as in the first embodiment.

Specifically, this connector comprises a first connector member 50 fitted to the panel 31 on the vehicle body side and provided with a housing 51 having an engaging recess 51a and containing terminal 52 on the vehicle body side in a form of the FPC or the FFC as shown in FIGS. 10 and 11, and a second connector member 60 provided with a housing 61 having engaging projections 61a adapted to be engaged with the engaging recess 51a and containing terminals on the electric equipment module side having contacts 62a in a tongue shape as shown in FIG. 12. The terminal 52 on the vehicle body side has contacts 52a exposed to an interior from the engaging recess 51a, and the terminals on the electrical equipment module side have the contacts 62a partially exposed to an exterior from the engaging projections 61a. The connector further comprises a contact structure adapted to bring the contacts 52a of the terminals 52 on the vehicle body side having an exposed conductive foil of the FPC or the FFC and the tongue-shaped contacts 62a of the terminals on the electrical equipment module side into contact to electrically connect them to each other by inserting the engaging projections 61a of the second connector member 60 into the engaging recess 51a of the first connector member 50.

More specifically, the above described terminal 52 on the vehicle body side is constructed in such a manner that the FPC or the FFC is fixed to the first connector member 50 by fixing parts 51b as shown in FIG. 10, an end portion of the FPC or the FFC is contained in a cavity in a crooked state in a direction different from an extending direction of the FPC or the FFC, with coating of the FPC of the FFC partially peeled off to expose the contacts 52a of a conductive foil.

The above described terminal on the electrical equipment module side includes four contacts 62a in a tongue shape and is connected by press-fitting to an electric cable 63 on the electrical equipment module side having the FPC or the FFC, and is locked to the second connector member 60 in such a manner that the tongue-shaped contacts 62a are exposed from four openings 61b provided on one side faces of the engaging projections 61a in a pillar shape as shown in FIG. 12.

Incidentally, when the engaging projections 61a of the second connector member 60 are inserted into the engaging recesses 51a of the first connector member 50, a cylindrical part 61c of the housing 61 of the second connector member 60 enters in a relief hole 51c formed in the housing 51 so as not to interfere.

The connector according to the present invention as described above is not limited to the specified structures of the above-described embodiments, but it is apparent that appropriate modifications, additions or cancellations of the structures may be made according to necessity.

For example, it has been described as the example of the structure that the housing of the first connector member attached to the panel on the vehicle body side has the engaging recess, while the housing of the second connector member has the engaging projections adapted to be engaged with the engaging recess. However, the present invention will not be limited to this structure, and may comprise such a structure that the housing of the first connector member has the engaging projections, while the housing of the second connector member has the engaging recess adapted to be engaged with the engaging projections.

As described above, the connector according to the present invention has the contact structure that by engaging the engaging recess (or the engaging projections) of the first connector member with the engaging projections (or the engaging recess) of the second connector member, the contacts of the terminals on the vehicle body side which are partially exposed outwardly from the engaging projections and the contacts of the terminals on the electrical equipment module side which are exposed inwardly from the engaging recess come into contact to be electrically connected with each other. Accordingly, the various kinds of the electrical equipment modules can be fitted to the panel on the vehicle body side without providing an extra length on the wire harness. Therefore, the fitting work can be simplified, an occurrence of an unusual noise by the driving vibration and bites of the electric wires will be prevented.

In the above described connector according to the present invention, in case where at least one of the terminal on the vehicle body side and the terminal on the electrical equipment module side has a contact in a tongue shape, it will be possible to enhance reliability of the electrical connection between the contacts.

Further, in case where one of the above described terminal on the vehicle body side and the terminal on the electrical equipment module side has the contact in a tongue shape, and the other of the terminals has the contact having the exposed conductive foil of the FPC or the FFC, it will be possible to conduct a multi-contact wiring and to enlarge the scope of application of the invention.

In case where the above described connector additionally includes locking parts for locking the terminals to the housings of the connector members, respectively, the workability of the fitting work can be further improved.

The connector according to the present invention is advantageous in case where the panel on the vehicle body side is the roof panel and the electrical equipment module is the sun visor unit provided with the electric circuit.

What is claimed is:

1. A connector for electrically connecting various electrical equipment modules to a panel on a vehicle body side, the connector comprising:

a first connector member attached to the panel on the vehicle body side and provided with a housing having an abutting surface in a first plane and an engaging recess extending at an angle that is not perpendicular to the first plane of the abutting surface, the first connector member containing a first terminal on the vehicle body side, the first terminal having a contact exposed inwardly from the engaging recess of the first connector member; and a second connector member provided with a housing having an abutting surface in a second plane corresponding to the first plane and an engaging projection formed at an angle corresponding to the angle of the engaging recess, the engaging projection being adapted to be engaged with the engaging recess of the first connector member, the second connector member containing a second terminal on an electrical equipment module side, the second terminal having a contact partially exposed outwardly from the engaging projection of the second connector member;

wherein, when the engaging projection of the second connector member is inserted into the engaging recess of the first connector member, the contact of the first terminal is electrically contactable to the contact of the second terminal.

2. A connector for electrically connecting various electrical equipment modules to a panel on a vehicle body side, the connector comprising:

a first connector member having an abutting surface in a first plane, the connector member being attached to the panel on the vehicle body side and provided with a housing having an engaging projection formed at an angle not perpendicular to the first plane of the abutting surface, the first connector member containing a first terminal on the vehicle body side, the first terminal having a contact partially exposed outwardly from the engaging projection of the first connector member; and a second connector member having an abutting surface in a second plane corresponding to the first plane provided with a housing having an engaging recess adapted to be engaged with the engaging projection of the first connector member at the angle of the engaging projection, the second connector member containing a second terminal on an electrical equipment module side, the second terminal having a contact exposed inwardly from the engaging recess of the second connector member;

wherein, when the engaging projection of the first connector member is inserted into the engaging recess of the second connector member, the contact of the first terminal is electrically contactable to the contact of the second terminal.

3. The connector according to claim 1 wherein the contact of at least one of the first terminal on the vehicle body side and the second terminal on the electrical equipment module side is formed in a tongue shape.

4. The connector according to claim 1, further comprising:

the contact of one of the first terminal on the vehicle body side and the second terminal on the electrical equipment module side is formed in a tongue shape; and the contact of the other of the terminals is an exposed conductive foil of a FPC or a FFC.

5. The connector according to claim 1, further comprising a locking part for locking the terminals to the housings of the connector members, respectively.

6. The connector according to claim 1 wherein the panel on the vehicle body side is a roof panel, and the electrical equipment module is a sun visor unit provided with an electric circuit.

7. The connector according to claim 2 wherein the contact of at least one of the first terminal on the vehicle body side and the second terminal on the electrical equipment module side is formed in a tongue shape.

8. The connector according to claim 2, further comprising:

the contact of one of the first terminal on the vehicle body side and the second terminal on the electrical equipment module side is formed in a tongue shape; and the contact of the other of the terminals is formed in an exposed conductive foil of a FPC or a FFC.

9. The connector according to claim 2, further comprising a locking part for locking the terminals to the housings of the connector members, respectively.

10. The connector according to claim 2 wherein the panel on the vehicle body side is a roof panel; and the electrical equipment module is a sun visor unit provided with an electric circuit.

* * * * *